US007676834B2

(12) United States Patent
Camaisa et al.

(10) Patent No.: US 7,676,834 B2

(45) Date of Patent: Mar. 9, 2010

(54) SYSTEM AND METHOD FOR BLOCKING UNAUTHORIZED NETWORK LOG IN USING STOLEN PASSWORD

(75) Inventors: Allan Camaisa, Las Vegas, NV (US); Robert Robb, Las Vegas, NV (US)

(73) Assignee: Anakam L.L.C., Las Vegas, NV (US)

( * ) Notice: Subject to any disclaimer, the term of this patent is extended or adjusted under 35 U.S.C. 154(b) by 1131 days.

(21) Appl. No.: 10/892,584

(22) Filed: Jul. 15, 2004

(65) Prior Publication Data

US 2006/0015742 A1 Jan. 19, 2006

(51) Int. Cl.

| | |
|---|---|
| ***G06F 7/04*** | (2006.01) |
| ***G06F 15/16*** | (2006.01) |
| ***G06F 17/30*** | (2006.01) |
| ***G06F 21/00*** | (2006.01) |
| ***H04L 29/06*** | (2006.01) |
| ***H04N 7/16*** | (2006.01) |

(52) U.S. Cl. ....................... 726/9; 726/2; 726/3; 726/4; 726/5; 726/26; 713/182; 713/185

(58) Field of Classification Search ......... 713/182–185; 726/2–9; 705/50, 56, 64–67, 70–72, 75–76
See application file for complete search history.

(56) References Cited

U.S. PATENT DOCUMENTS

| | | | | |
|---|---|---|---|---|
| 5,590,199 | A * | 12/1996 | Krajewski et al. | 713/159 |
| 5,737,421 | A | 4/1998 | Audebert | |
| 5,802,176 | A | 9/1998 | Audebert | |
| 5,887,065 | A | 3/1999 | Audebert | |
| 5,937,068 | A | 8/1999 | Audebert | |
| 5,982,898 | A * | 11/1999 | Hsu et al. | 713/156 |
| 6,035,404 | A * | 3/2000 | Zhao | 726/6 |
| 6,047,268 | A * | 4/2000 | Bartoli et al. | 705/35 |
| 6,076,163 | A | 6/2000 | Hoffstein | |
| 6,085,320 | A | 7/2000 | Kaliski | |
| 6,130,621 | A | 10/2000 | Weiss | |
| 6,157,920 | A | 12/2000 | Jakobsson | |
| 6,189,098 | B1 | 2/2001 | Kaliski | |

(Continued)

OTHER PUBLICATIONS

David M. Piscitello, Lisa Phifer. Business Communications Review. Hinsdale: Dec. 2002. vol. 32, Iss. 12; p. 32, 8 pgs.*

(Continued)

*Primary Examiner*—Ponnoreay Pich
*Assistant Examiner*—Randal D Moran
(74) *Attorney, Agent, or Firm*—John L. Rogitz

(57) ABSTRACT

To limit access to thieves of passwords, at initial registration with a Web server, a user is given a password and user name, and a cookie including a login key and machine ID is downloaded to the user. For subsequent log ins, the user inputs the user name and password and if they are correct, the server checks the cookie on the user computer to determine whether the login key and machine ID matches the record stored in the server before granting access. If access is successful a new login key is sent in a new cookie to be used in the next subsequent login so that the login key changes every login. If the cookie check is unsuccessful, the server refuses access until a user validation process has been completed.

29 Claims, 2 Drawing Sheets system

U.S. PATENT DOCUMENTS

| | | | | |
|---|---|---|---|---|
| 6,202,159 | B1 * | 3/2001 | Ghafir et al. | 726/3 |
| 6,240,184 | B1 | 5/2001 | Huynh | |
| 6,269,163 | B1 | 7/2001 | Rivest | |
| 6,286,022 | B1 | 9/2001 | Kaliski | |
| 6,308,268 | B1 | 10/2001 | Audebert | |
| 6,373,969 | B1 | 4/2002 | Adler | |
| 6,389,442 | B1 | 5/2002 | Yin | |
| 6,393,447 | B1 | 5/2002 | Jakobsson | |
| 6,411,715 | B1 | 6/2002 | Liskov | |
| 6,429,927 | B1 | 8/2002 | Borza | |
| 6,434,259 | B1 | 8/2002 | Hamid | |
| 6,446,052 | B1 | 9/2002 | Juels | |
| 6,446,210 | B1 | 9/2002 | Borza | |
| 6,460,141 | B1 | 10/2002 | Olden | |
| 6,498,861 | B1 | 12/2002 | Hamid | |
| 6,584,505 | B1 | 6/2003 | Howard et al. | |
| 6,598,072 | B1 * | 7/2003 | McBrearty et al. | 709/203 |
| 6,662,231 | B1 * | 12/2003 | Drosset et al. | 709/229 |
| 6,694,436 | B1 | 2/2004 | Audebert | |
| 6,700,606 | B1 | 3/2004 | Borza | |
| 6,721,891 | B1 | 4/2004 | Borza | |
| 6,760,844 | B1 * | 7/2004 | McCarthy et al. | 726/5 |
| 6,769,068 | B1 * | 7/2004 | Brozowski et al. | 726/5 |
| 6,772,954 | B2 | 8/2004 | Boyer | |
| 6,813,354 | B1 | 11/2004 | Jakobsson | |
| 6,831,980 | B1 | 12/2004 | Borza | |
| 6,836,845 | B1 * | 12/2004 | Lennie et al. | 713/181 |
| 6,848,052 | B2 | 1/2005 | Hamid | |
| 6,857,078 | B2 * | 2/2005 | Colvin | 726/22 |
| 7,100,049 | B2 | 8/2006 | Gasparini et al. | |
| 7,345,775 | B2 | 3/2008 | Kimura | |
| 7,346,775 | B2 | 3/2008 | Gasparini et al. | |
| 2001/0044896 | A1 * | 11/2001 | Schwartz et al. | 713/169 |
| 2002/0029279 | A1 * | 3/2002 | Campbell et al. | 709/229 |
| 2002/0031230 | A1 * | 3/2002 | Sweet et al. | 380/278 |
| 2002/0133706 | A1 | 9/2002 | Khanna et al. | |
| 2002/0184496 | A1 * | 12/2002 | Mitchell et al. | 713/168 |
| 2003/0005308 | A1 | 1/2003 | Rathbun et al. | |
| 2003/0046551 | A1 * | 3/2003 | Brennan | 713/185 |
| 2003/0093430 | A1 | 5/2003 | Mottur | |
| 2003/0149900 | A1 | 8/2003 | Glassman et al. | |
| 2003/0177351 | A1 | 9/2003 | Skingle | |
| 2003/0217288 | A1 * | 11/2003 | Guo et al. | 713/201 |
| 2003/0229782 | A1 | 12/2003 | Bible, Jr. et al. | |
| 2004/0059951 | A1 * | 3/2004 | Pinkas et al. | 713/202 |
| 2004/0098609 | A1 * | 5/2004 | Bracewell et al. | 713/200 |
| 2004/0103203 | A1 | 5/2004 | Nichols et al. | |
| 2004/0103297 | A1 * | 5/2004 | Risan et al. | 713/200 |
| 2004/0103300 | A1 | 5/2004 | Risan et al. | |
| 2004/0111621 | A1 | 6/2004 | Himberger et al. | |
| 2004/0123103 | A1 | 6/2004 | Risan et al. | |
| 2004/0172535 | A1 | 9/2004 | Jakobsson | |
| 2005/0108551 | A1 * | 5/2005 | Toomey | 713/185 |
| 2005/0177730 | A1 | 8/2005 | Davenport et al. | |
| 2006/0106605 | A1 | 5/2006 | Saunders et al. | |
| 2007/0180496 | A1 | 8/2007 | Fransdonk | |

OTHER PUBLICATIONS

Camaisa, et al. co-pending application titled "System and Method for Blocking Unauthorized Network Log In Using Stolen Password" filed Mar. 11, 2005 U.S. Appl. No. 11/077,948.

Camaisa, et al. co-pending application titled "System and Method for Blocking Unauthorized Network Log In Using Stolen Password" filed Oct. 24, 2005 U.S. Appl. No. 11/257,421.

Rodry, "Cookie based authentication: is it secure?", Published on Aug. 28, 2000, http://www.perimonks.org?node_id=29928, Retrieved data Apr. 10, 2009.

U.S. Appl. No. 11/257,421—Camaisa et al.; Non-Final Office Action dated Oct. 19, 2009.

* cited by examiner

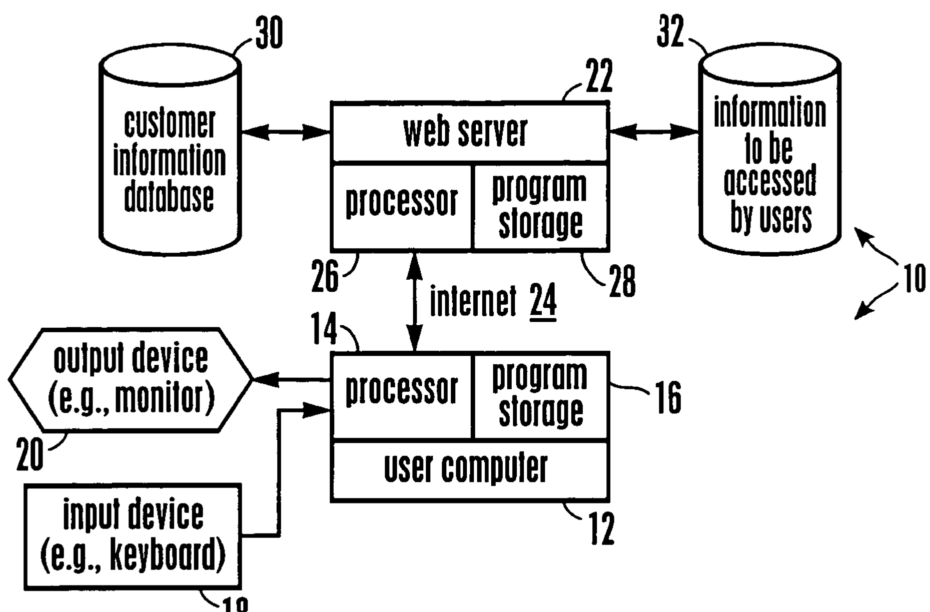
Figure 1 system
Figure 2 registration logic
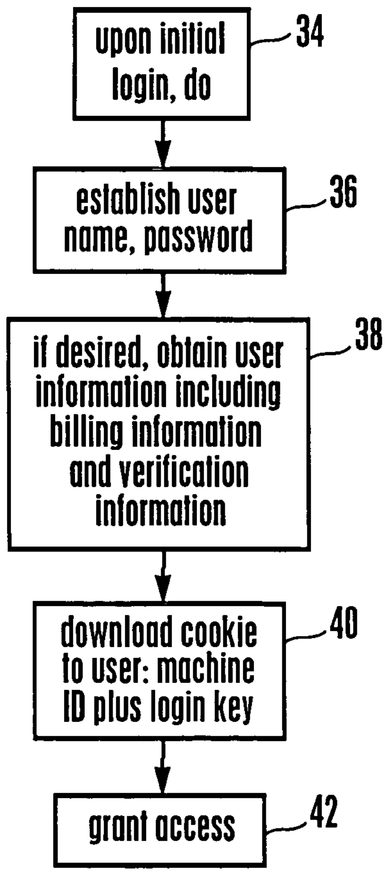

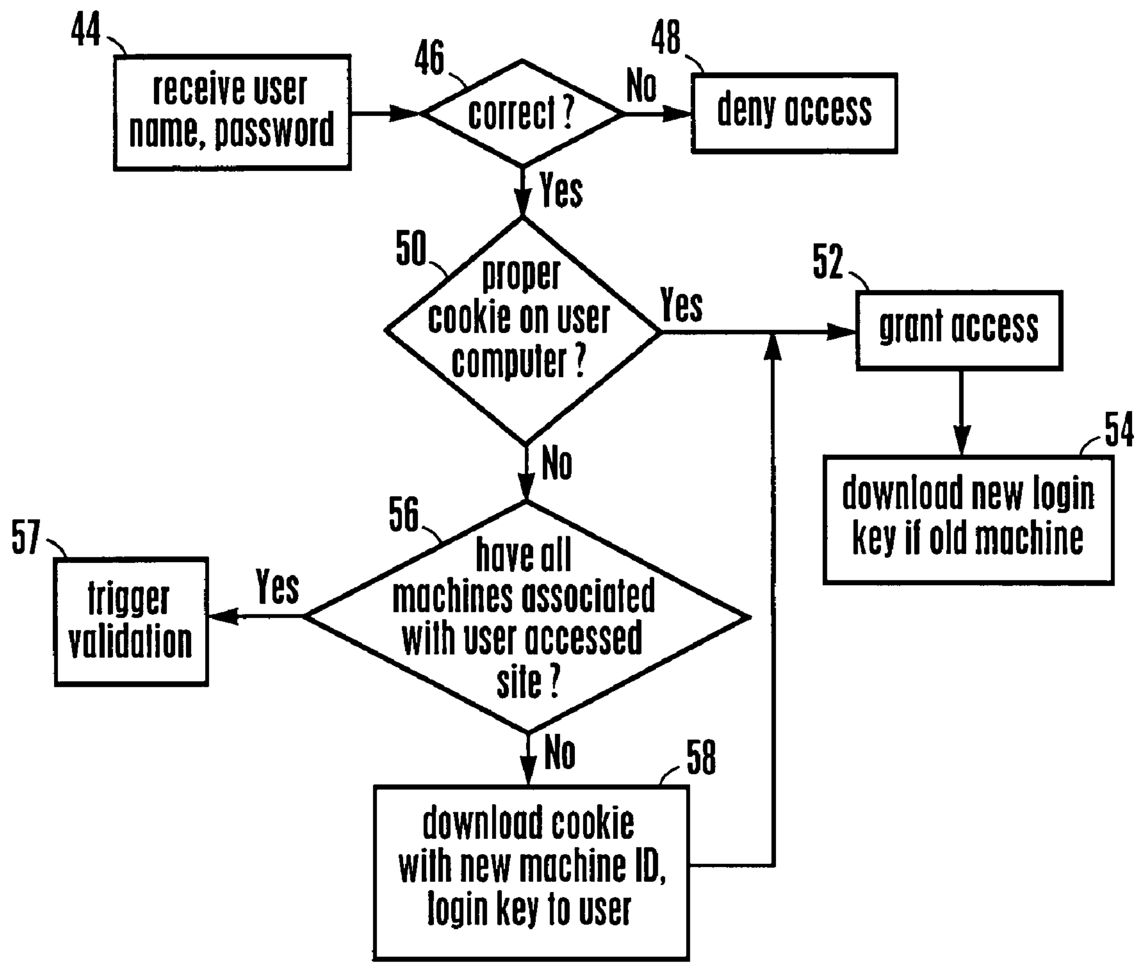
Figure 3 subsequent log_ins

SYSTEM AND METHOD FOR BLOCKING UNAUTHORIZED NETWORK LOG IN USING STOLEN PASSWORD

I. FIELD OF THE INVENTION

The present invention relates generally to preventing unauthorized network log in using a stolen password.

II. BACKGROUND OF THE INVENTION

Passwords are a ubiquitous way to provide a minimal level of authentication to a computer user seeking to access a network computer such as a Web site. For instance, online banking requires a user to log in to a Web server of a financial institution using a user name and password that have been previously given to the user by the server. In this way, only a user (hopefully, the true account owner) who possesses both the user name and password can gain access to the user's account.

As another example, some Web servers provide subscription services. For instance, users can subscribe to a Web site to receive news publications, music titles, etc. To ensure that only users who have paid the subscription fee can access the content, a user seeking access is required to log in using a user name and password.

In either case, it is possible that a password can be stolen and information intended only for the rightful owner of the password consequently fall into the hands of a password thief. Some estimates for the year 2003 indicate that as many as two million Americans have had their online bank accounts raided, at an average loss of $1200 for a total loss in excess of $2 billion. A common way for thieves to gain access is to send official-looking emails to bank customers, requesting user names and passwords which, if the illegitimate requests are complied with, are then used to log in to online accounts and drain them of money. Having recognized the above problem, the solution herein is provided.

SUMMARY OF THE INVENTION

A method for selectively granting a user access to data includes, at a Web server, receiving a user name and password from a user computer. Without limitation the Web server may be an online banking server or a content subscription server. If the user name and password are valid, a previously-deposited cookie on the user computer is accessed, and the server determines whether the cookie is valid. Only if the cookie, user name, and password are valid is access granted to the data to the user computer. Otherwise, a user validation process is initiated.

In non-limiting embodiments the cookie includes at least a login key and a machine ID. If the cookie, user name, and password are valid and access is granted to the user computer, a new cookie subsequently is downloaded to the user computer for use during the next login attempt. The new cookie includes the same machine ID as the old cookie but a different login key.

If desired, non-limiting methods may further include, prior to initiating a user validation process when a valid cookie is not found on the user computer, determining whether all N machines allocated by the server to the user have accessed the server, wherein $N \geqq 1$. If not, the server downloads a cookie to the user computer that is attempting access, with this cookie having a unique machine ID and a unique login key. The server then grants the user computer access, perhaps after successful validation.

Exemplary non-limiting examples of the validation process can include sending an email to the user, with the email containing at least one hyperlink to a Web site at which a new cookie that, is valid for accessing the data may be obtained. Access to the Web site at which the new cookie is located can be disabled after the user clicks on the hyperlink. Or, the validation process can include prompting the user to call a telephone number to verify predetermined information, or to access a Web site to verify predetermined information online.

In another aspect, a system is disclosed for impeding a thief possessing a password of a user from accessing information intended to be accessed by the user. The system includes at least one user computer associated with the user, and a server computer controlling access to the information. The server computer grants access to the information only upon receipt of a valid password and determination that a valid verification string resides on the user computer; otherwise, the server initiates a validation process.

In yet another aspect, a computer system includes a Web server that has means for sending a user name and a password to a user computer, and means for sending a verification string to the user computer. The verification string includes a machine ID that is substantially unique to the user computer and a login key that is refreshed each time the user computer accesses the Web server. The server also has means for, subsequent to sending the verification string to the user computer and in response to an attempted log in from a login computer that may or may not be the user computer, determining whether a password sent from the login computer is valid, and whether the verification string resides on the login computer. Means are provided for, if the password is valid but the verification string does not reside on the login computer, refusing access and then initiating a validation process, and/or determining whether all N machines allocated to the user have accessed the server. If not all allocated machines have accessed the server, a verification string having a machine ID that is different from the machine ID of the user computer and a login key that is different from the login key of the user computer is downloaded to the login computer, which can then be granted access.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an exemplary system for implementing the present invention;

FIG. 2 is a flow chart of the registration logic; and

FIG. 3 is a flow chart of the subsequent log in logic.

DETAILED DESCRIPTION OF THE PREFERRED EMBODIMENT

Referring initially to FIG. 1, a system is shown, generally designated 10, that includes plural user computers 12 (only a single user computer shown for clarity) each of which can have a processor 14 and disk and/or solid state program storage 16 for storing software embodying logic. Also, each user computer 12 can include one or more input devices 18 such as keyboards, mice, voice recognition devices, etc. as well as one or more output devices 20 such as monitors, printers, other computers, etc.

As shown in FIG. 1, the user computer 12 communicates with a Web server 22 over the Internet 24. The server 22 has a processor 26 and disk and/or solid state program storage 28 for storing software embodying logic including all or part of the logic discussed further below. The server 22 may access a customer information database 30 that contains the log in and registration information on users set forth further below, it being understood that the database can be pre-populated with user information on existing customers who elect to start up the present service. Also, the server 22 may access an information database 32 to supply users with desired information, e.g., bank account records, subscription content, etc. The databases 30, 32 may be implemented in a single data structure if desired.

Now referring to the initial registration logic of FIG. 2, commencing at block 34, the user logs in for the initial time. Moving to block 36, a user name and a password are established, for instance by allowing the user to select a user name and password or with the server 22 conferring a user name and password on the user. In block 38, additional user information can be obtained if desired. Such user information might include billing information and validation information. The validation information can be confidential to the user so as to protect his account from outside unwanted users who might have stolen the user's account information, in accordance with further logic set forth below. It is to be understood that the validation information alternatively can be previously obtained from the user in various ways, online or off-line.

At block 40, at the same time the user registers or subsequently in the case of users who are already registered with the server for other purposes but now for the first time commence the present service, the user's computer is sent a verification string. The verification string is preferably but not necessarily one that does not require user interaction or special software, such as a cookie that can have a machine ID and a login key, e.g., a 4096 bit string with randomly generated value. The cookie requires no special client software and is completely invisible to the user. Both the machine ID and the login key are randomly generated, stored on the server, and associated with that user's account. Once the user's account is established, the machine ID and the login key become associated with that user's account. Access is granted if all user information and user account information is correct, shown in block 42.

After registration the logic that can be implemented by the server 22 moves to FIG. 3 for subsequent attempts by the user to log on to the server 26 and access the user information contained in the database 32 shown in FIG. 1. Beginning with block 44, upon subsequent logins the user enters the user name and password. At decision diamond 46, the server checks the user name and password's validity. If the user name and password are not correct, user access is denied at block 48.

If, at decision diamond 46, it is determined that the user name and password are correct, the logic flows to decision diamond 50 wherein the server checks the user's computer to verify the correct cookie is stored on the user's computer by, e.g., comparing the cookie on the user's computer with server cookie records. If the server determines the cookie is present and correct, access to the user information in the database 32 is granted at block 52. Then, at block 54, assuming that the machine being used is not a newly entered machine as discussed further below in relation to block 58, a new login key carried on a new cookie preferably over an SSL encrypted link is downloaded. This new cookie with new login key is used for the next user login using the same machine. The login key in the new cookie is different from the login key of the old cookie but the machine ID stays constant.

In contrast, if, at decision diamond 50, it is determined that the cookie on the user computer is not correct, the server 22 moves to decision diamond 56 to determine whether all the computers that have been allocated to the user have accessed the server 22. In other words, in some applications such as online banking the server may allocate to the user at registration, in response to a user request, more than a single computer (i.e., to use "N" computers, $N \geqq 1$) to access the information in the database 32. For instance, an online banking customer might want to access his bank account from both an office computer and a home computer. If all of the "N" allocated computers that have been allocated to the user have accessed the server 22 and have been granted cookies, meaning that the currently used computer is in excess of the authorized number, user access is denied and the logic flows to block 57 to trigger a validation process. If desired, to foil a dictionary attack only a limited number of login/cookie verification attempts may be allowed from any one machine, after which the machine is locked out until successful validation occurs.

In a non-limiting implementation, the validation process can include the user entering the confidential information initially given in the initial login process. The validation information can be the user's mother's maiden name, the user's social security number, or some other information that preferably is personal to the user. The server 22 then checks the user input against the validation information that was gathered at block 38 in FIG. 2. If a match is found, validation is successful and the user is granted access; otherwise, validation is unsuccessful and access is denied.

In some implementations the validation process can include sending an email to the user. The email can contain a hyperlink to a Web site at which a new cookie that is valid for accessing the data may be obtained. If desired, access to the Web site at which a new cookie may be obtained can be disabled after the user clicks once on the hyperlink. Or, the validation process can include prompting the user to call a telephone number to verify predetermined information, or to access a Web site to verify predetermined information online. Once validation is successful, the server 22 permits access to the information in the database 32.

In contrast, if the server determines at decision diamond 56 that not all machines that have been allocated have accessed the server 22, a new cookie with a new machine ID and login key is downloaded to the new computer at block 58. The logic then loops back to block 52 to grant access, in some embodiments only after having triggered the validation first as described at block 57 to ensure that the correct user is logging in.

In the context of adding a new machine when more than a single user computer is authorized, the new machine can be automatically added at its first login in accordance with the logic above (assuming the above-described conditions have been met), or the server can ask the user of the new machine whether the new machine is to count as one of the "N" authorized machines, temporarily or otherwise. If the user indicates that the machine is to be temporary only (e.g., if the user is operating a terminal at a hotel), the user could specify an expiration date and/or number of logins after which any access to the user information from that machine would be denied, or at the least would trigger the verification process once again. This can be done by causing the cookie to be designated "expired" at the end of the period. For instance, at an in-hotel room terminal, a user might specify an expiration at the expected check out time, or a user could specify a number of logins to allow from that machine before the verification process is triggered again. The expiration information is stored at the server. When a machine expires, the number of new machines remaining to be added to the user's account may be reset by one. In contrast, the user would not be asked for temporary use information when communicating with the server from a core set of computers from which the user has authorized permanent access.

While the particular SYSTEM AND METHOD FOR BLOCKING UNAUTHORIZED NETWORK LOG IN USING STOLEN PASSWORD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A computer-implemented method for selectively granting a user access to data, comprising:

at a Web server, receiving a user name and password from a user computer;

if the password or user name is not valid, refusing validation, and only if both the password and user name are valid, determining whether a cookie was previously deposited on the user computer by the Web server prior to the receiving act and if so, whether the cookie is valid, and only if the cookie, the user name, and the password are valid, granting access to the data to the user computer; otherwise, always initiating a user validation process if the user computer has been previously validated at least if the password is valid but the cookie is not, wherein the cookie includes a first machine ID and a first login key and is downloaded from the Web server to the user computer without requiring software on the user computer to generate the cookie, wherein, if the cookie, user name, and password are valid and access is granted to the user computer, a new cookie is downloaded to the user computer, the new cookie including the first machine ID and a second login key different from the first login key, the new cookie being used by the Web server to test for validation in a subsequent login to the Web server.

2. The method of claim 1, wherein the Web server is an online banking server.

3. The method of claim 1, wherein the Web server is a content subscription server.

4. The method of claim 1, wherein N≧1 machines are allocated to the user and the method further comprises, prior to initiating a user validation process when a valid cookie is not found on the user computer, determining whether all N≧1 machines allocated to the user have accessed the server, and if not, downloading to the user computer attempting access a cookie having a second machine ID different from the first machine and a second login key different from the first login key.

5. The method of claim 1, wherein the validation process includes sending an email to the user, the email containing at least one hyperlink to a Web site at which a new cookie valid for accessing the data may be obtained.

6. The method of claim 5, wherein access to the Web site at which a new cookie valid for accessing the data may be obtained is disabled after the user clicks on the hyperlink.

7. The method of claim 1, wherein the validation process includes prompting the user to call a telephone number to verify predetermined information.

8. The method of claim 1, wherein the validation process includes prompting the user to access a Web site to verify predetermined information online.

9. The method of claim 1, wherein the user computer may be used to access the data for only a limited period of time, after which access is denied.

10. A system for impeding a thief possessing a password of a user from accessing, from a user computer associated with the user, information intended to be accessed by the user, comprising:

a server computer controlling access to the information, the server computer granting access to the information only upon receipt of a valid password and determination that a valid verification string previously deposited on the user computer resides on the user computer, the server computer otherwise initiating a validation process at least under the condition of the password being valid and the verification string not being valid, wherein the verification string is a cookie and the cookie includes at least a login key and a machine ID, and further wherein the login key is a first login key, and wherein, if the cookie and password are valid and access is granted to the user computer, the server downloads a new cookie to the user computer, the new cookie including the machine ID and a second login key different from the first login key.

11. The system of claim 10, wherein a valid verification string is downloaded to the user computer during a registration process.

12. The system of claim 10, wherein the Web server is an online banking server.

13. The system of claim 10, wherein the Web server is a content subscription server.

14. The system of claim 10, wherein the server, prior to initiating a user validation process when a valid cookie is not found on the user computer, determines whether all N machines allocated to the user have accessed the server, and if not, the server downloads to the user computer attempting access a cookie having a second machine ID different from the first machine ID and a second login key different from the fast login key.

15. The system of claim 10, wherein the validation process includes sending an email to the user, the email containing at least one hyperlink to a Web site at which a new string valid for accessing the data may be obtained.

16. The system of claim 15, wherein access to the Web site at which a new string valid for accessing the data may be obtained is disabled after the user clicks on the hyperlink.

17. The system of claim 10, wherein the validation process includes prompting the user to call a telephone number to verify predetermined information.

18. The system of claim 10, wherein the validation process includes prompting the user to access a Web site to verify predetermined information online.

19. A computer system, comprising:

a Web server computer comprising:

means for sending a verification string to a user computer, the verification string including a machine ID unique to the user computer and a login key that is refreshed each time the user computer logs in to the Web server by a user, wherein N≧1 machines are associated with the user;

means for, subsequent to sending the verification string to the user computer and in response to an attempted log-in from a login computer that may or may not be the user computer to gain access to information the access to which is controlled by the Web server, determining whether at least a password sent from the login computer is valid, and whether the verification string resides on the login computer;

means for granting access to the user computer if both the password is valid and the verification string resides on the user computer;

means for performing a validation process wherein if the password is valid but the verification string does not reside on the login computer, refusing access pending a successful validation and then determining whether all N≧1 machines associated with the user have accessed the Web server.

20. The system of claim 10, wherein the user computer may be used to access the information for only a limited period of time, after which access is denied.

21. The system of claim 19, wherein if not all N machines have accessed the server, the server downloads to the login computer a verification string having a machine ID different from the machine ID of the user computer and a login key different from the login key of the user computer.

22. The system of claim 19, wherein a valid verification string is downloaded to the user computer during a registration process.

23. The system of claim 19, wherein the Web server is at least one of an online banking server, and a content subscription server.

24. The system of claim 19, wherein the validation process includes sending an email to the user, the email containing at least one hyperlink to a Web site at which a new verification string valid for accessing the data may be obtained.

25. The system of claim 19, wherein the validation process includes prompting the user to call a telephone number and/or to access a Web address to verify predetermined information.

26. The method of claim 9, wherein access is denied by designating the verification string to be expired.

27. The system of claim 20, wherein access is denied by designating the verification string to be expired.

28. The system of claim 19, wherein the user computer may be used to access the information for only a limited period of time, after which access is denied.

29. The system of claim 28, wherein access is denied by designating the verification string to be expired.

* * * * *